A. ROOS.

APPARATUS FOR COOLING OR HEATING LIQUIDS.

No. 9,977. Reissued Dec. 20, 1881.

Witnesses.
William Miller
Otto Neufeld

Inventor.
August Roos
by Van Santvoord & Hauff
his attys

N. PETERS, Photo-Lithographer, Washington, D.C.

UNITED STATES PATENT OFFICE.

AUGUST ROOS, OF NEW YORK, N. Y.

APPARATUS FOR COOLING OR HEATING LIQUIDS.

SPECIFICATION forming part of Reissued Letters Patent No. 9,977, dated December 20, 1881.

Original No. 248,796, dated October 25, 1881. Application for reissue filed November 29, 1881.

*To all whom it may concern:*

Be it known that I, AUGUST ROOS, a citizen of the United States, residing at New York, in the county and State of New York, have invented a new and useful Improvement in Apparatus for Cooling or Heating Liquids, of which the following is a specification.

This invention relates to an apparatus for cooling or heating beer or other liquids, which is composed of an annular chamber hermetically closed and provided with two pipes, one of which passes through, but does not extend beyond, the inner surface of one of the heads of said chamber, while the other passes through the same head of the chamber and extends nearly to the opposite head. The annular chamber is divided into a series of compartments communicating with each other by means of holes, which are diametrically opposite to each other, or nearly so, for the purpose of insuring a circulation of the cooling or heating medium through said chamber.

Figure 1:
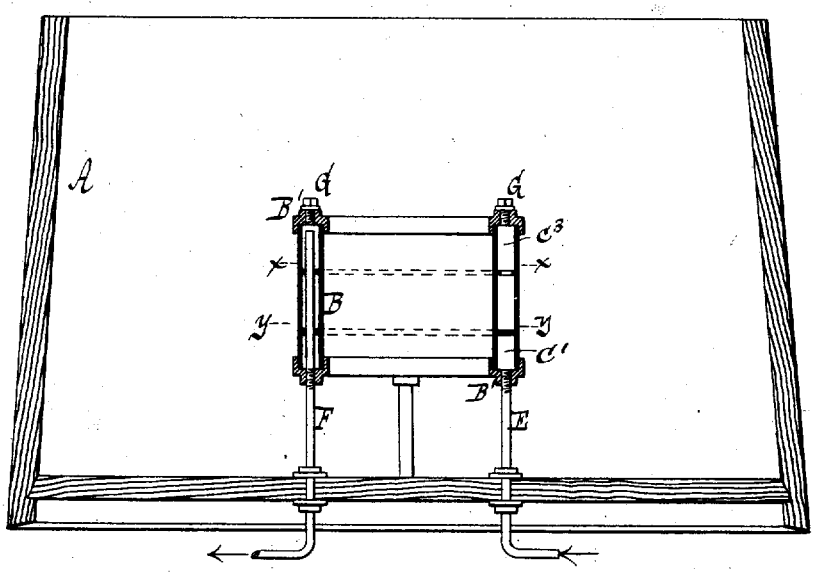
Figure 2:
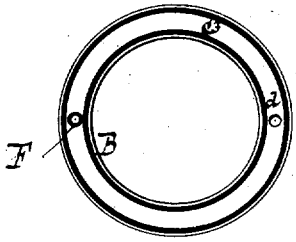
Figure 3:
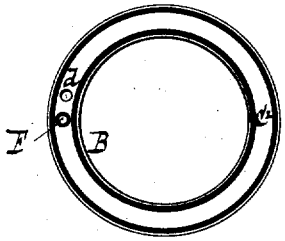

This invention is illustrated in the accompanying drawings, in which Figure 1 represents a vertical cross-section. Fig. 2 is a horizontal section on the line *x x*, Fig. 1. Fig. 3 is a similar section on the line *y y*, Fig. 1.

Similar letters indicate corresponding parts.

The letter A designates a tub or vessel designed to receive the beer or other liquid to be heated or cooled, as the occasion requires. In this vessel is located the attemperator, consisting of an annular chamber, B, hermetically closed, so as to prevent the liquid contained in the vessel A from passing into the same. With this chamber are combined two pipes, E and F, for the introduction and discharge of the cooling or heating medium. These pipes are situated on opposite sides of the chamber, and the pipe E terminates near the bottom, while the pipe F extends through the bottom and rises nearly to the top of the chamber, so that the cooling or heating medium on being admitted through the pipe E has to circulate through the chamber B and rise up nearly to its top before it can discharge through the pipe F. For the purpose of increasing the circulation the chamber B is divided into three (more or less) compartments, $C' C^2 C^3$, which communicate with each other by means of apertures *d*, formed in the partitions between the compartments, one diametrically opposite the other, or nearly so. The pipe E connects with the compartment $C'$, and the pipe F extends through the compartments $C' C^2$ into the compartment $C^3$.

In practice the pipes E F are connected with a source of supply for a suitable cooling or heating medium—as, for example, cold water—E being an inlet-pipe and F being an outlet-pipe, and as the water enters through the pipe E it is compelled to circulate through the chamber B before it is permitted to discharge through the pipe F, so that it produces the best possible effect.

The annular chamber B is constructed with heads $B'$, which are flanged to receive the sides thereof, and in the upper pair of which are arranged screw-plugs G, to allow the admission of water for flushing the chamber. The pipes E F enter the chamber B from below, and thus assist in supporting the same in the vessel A; but, if desired, the pipes may be made to enter the chamber from an upper direction, and in that case legs are used to support the apparatus.

What I claim as new, and desire to secure by Letters Patent, is—

1. The combination, substantially as hereinbefore described, with a liquid-vessel, of the annular attemperating-chamber hermetically closed and the two pipes E F, one of said pipes passing through, but not extending beyond, the inner surface of one of the heads of said chamber, while the other pipe passes through the same head of the chamber and extends nearly to the opposite head.

2. The combination, substantially as hereinbefore described, with a liquid-vessel, of the annular attemperating-chamber divided into a series of compartments arranged one above the other and separated by partitions, said compartments communicating with each other by means of apertures, which are diametrically opposite to each other, or nearly so, and the inlet and outlet pipes for a cooling or heating medium, connected to the end compartments of the chamber, respectively, for the purpose set forth.

In testimony whereof I have hereunto set my hand and seal in the presence of two subscribing witnesses.

AUGUST ROOS. [L. S.]

Witnesses:

W. HAUFF,

CHAS. WAHLERS.